May 1, 1928.
G. W. ALDEEN
SPOTLIGHT
Filed Feb. 15, 1924
1,668,184
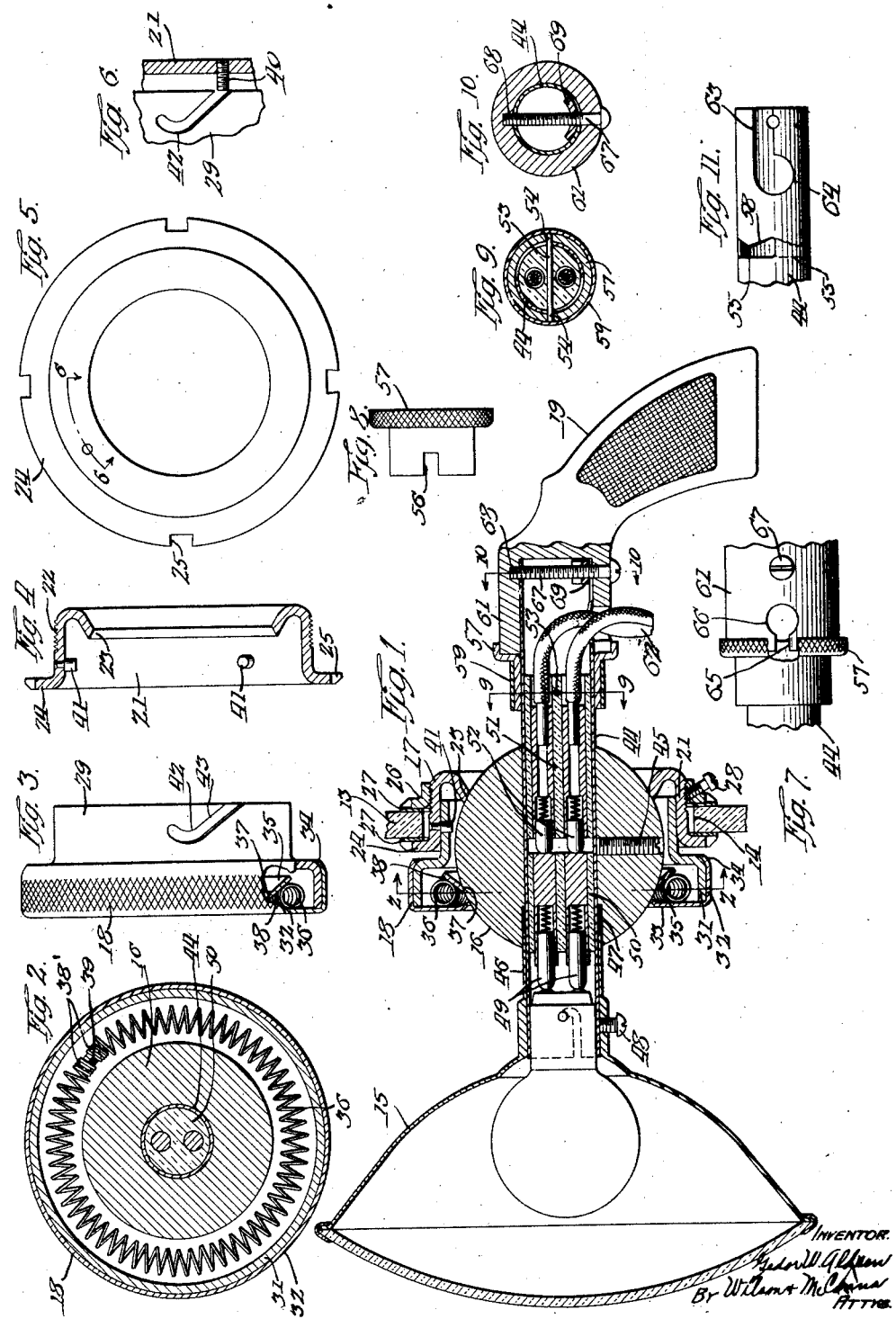

Patented May 1, 1928.

1,668,184

UNITED STATES PATENT OFFICE.

GEDOR W. ALDEEN, OF ROCKFORD, ILLINOIS, ASSIGNOR TO FYRAC MANUFACTURING CO., OF ROCKFORD, ILLINOIS, A CORPORATION OF ILLINOIS.

SPOTLIGHT.

Application filed February 15, 1924. Serial No. 692,975.

This invention relates to spotlights of the type having a universal mounting in a supporting member such as a windshield, and has more particular reference to ball and socket universal mountings.

The primary purpose of my invention is to improve the construction of spotlights of this type, with the view to making a more practicable and durable construction than what has previously been provided.

Another purpose is to provide a spotlight which may be more quickly and easily installed in a windshield or any other support and which does not require adjustment of parts to obtain the desired operative relation thereof when installing. In this regard, my invention comprehends the provision of several co-operating units of assembly, each comprising completely organized parts for their respective purposes and which function in co-operation with other parts when the units are assembled in operative relation.

More particularly, I have provided a ball-and-switch unit, a spring-socket unit and a fixed socket unit. The ball-and-switch unit includes, completely assembled, a ball member, a spotlight, a lamp plug, a switch plug and a handle; the spring socket unit includes a friction ring or socket which seats on the ball, a tension-imposing spring, and a spring container or casing; and the fixed socket unit includes a socket ring on which the ball seats, a threaded body, and a fixed and a threaded clamp member. The fixed socket unit is adapted to be installed on a windshield or other support and rigidly clamped thereon by the fixed and threaded clamp members.

The fixed and spring socket units are detachably connected together by a bayonet joint, this being an important feature of my invention. Such construction permits of quick installation and also allows the spring-socket unit to be quickly and easily removed to permit removal of the ball-and-switch unit without disturbing the mounting of the fixed-socket unit on the supporting member.

I have also aimed to provide means for locking the socket units together from one side of the support, such as from the inside of a windshield to prevent theft of the removable unit from the outside.

Other objects are to provide an improved fixed and spring socket construction, an improved switch, and an improved handle and wiring construction.

Still another object is to so design and construct the parts that most of them, especially the principal parts, may be pressed or stamped from sheet metal, thereby greatly reducing the cost of manufacture.

Other objects and attendant advantages will be appreciated by those skilled in this art as the invention becomes better understood by reference to the following description when considered in connection with the accompanying drawing, in which—

Figure 1 is a vertical sectional view through a spotlight embodying my invention;

Fig. 2 is a section taken on the line 2—2 of Fig. 1;

Fig. 3 is a side elevation, partly in section, of the spring-socket unit;

Fig. 4 is a section through the socket ring;

Fig. 5 is a rear view of said socket ring;

Fig. 6 is a detail section taken on the line 6—6 of Fig. 5;

Fig. 7 is a bottom fragmentary view of the switch sleeve and handle barrel;

Fig. 8 is a side elevation of the switch sleeve;

Figs. 9 and 10 are cross-sectional views taken on the lines 9—9 and 10—10, respectively of Fig. 1; and Fig. 11 is a bottom view of the handle-carrying end of the tube forming part of the ball-and-switch unit.

My improved spolight may be mounted on any suitable support, preferably a windshield. In this instance, the windshield designated by 13, has an opening 14 in which the spotlight device is mounted for universal movement.

In the preferred embodiment of my invention, the spotlight designated generally by 15, is attached to and carried by a ball member 16 which in turn is mounted for universal movement in a socket structure comprising what I have termed a fixed-socket unit designated generally by 17, and a spring-socket unit, by 18, one of these units being fixedly mounted on the windshield. By means of a handle 19, preferably in the form of a pistol grip, attached to the ball member 16, which will be described more fully hereinafter, the ball member may be moved in its socket mounting for directing the spotlight.

The principal member of the fixed-socket unit is a socket ring in the form of a cylindrical body 21 peripherally threaded at 22 and turned inwardly at one end, providing a fixed socket or ball seat 23, and outwardly at its opposite end, providing an annular clamp flange 24 having wrench slots 25. By means of a clamp ring nut 26 threadedly engaged on the socket ring, the latter when inserted in the opening 14 as shown, may be rigidly and securely clamped to the windshield or support. In practice, a pair of suitable washers 27 are interposed between the windshield and the clamp flange and the clamp ring-nut, thus providing a watertight joint between the socket ring and windshield. The clamp ring-nut has wrench slots so that this as well as the socket ring may be securely held by special wrenches when tightening the ring-nut. It will be observed that this socket unit when mounted on the windshield remains fixed thereon and is structurally independent of the remaining parts of the spotlight structure in the sense that such parts may be mounted in operative relation to and removed from said socket unit without disturbing its position on the windshield. It will also be noted that the clamp ring-nut is located on the inner side of the windshield and is preferably locked thereon by means of a set screw 28 or the equivalent, so that it is impossible to remove this unit from the outside of a closed car.

The spring socket or spring-container, unit 18 includes a casing or housing in the form of a sleeve 29 adapted to telescope within the cylindrical body portion 21 of the socket ring and being enlarged in diameter at its front end, providing a peripheral wall 31 of the spring container. A knurled ring 32 having a radially disposed end wall 33, is peened over the sleeve at 34 after a friction ring or socket seat 35 and a spring 36 have been assembled within the container. The ring 35 is frusto-conical in form and has a finished edge 37, providing a seat for the ball member. The spring within the container acts against the outer inclined face 38 of the friction ring and is under such tension as to contract toward the smaller end of said ring, thereby tending to force the ring to the right and impose a constant but yielding friction on the spherical surface of the ball when in co-operative relation therewith. Other forms of springs than what is here disclosed may be used, but I prefer to employ a coiled spring arranged in a circle as plainly shown in Fig. 2, and connected together at its ends. The wire at each end of the spring is wound in close convolutions 38', providing thread-like sockets into which a screw coupling member 39 may be threaded for connecting said ends together. The tendency of this coiled spring is to contract and urge the friction ring to the right, viewing Fig. 1, until limited by contact with the ball member when assembled, or with the shoulder at the forward end of the sleeve portion 29 when this unit is removed. The pressure imposed by a spring of this kind is evenly distributed circumferentially about and imposed on the friction ring. This, together with the fact that the ring is floating on the ball member and self-centering thereon, causes the friction ring to find a seat continuously around the ball member in any adjusted position of the latter. The friction between the ring and ball member will be substantially uniform and constant at all points, thereby insuring that a given position may be obtained indefinitely. This construction permits easy directional movement of the ball member and impose sufficient friction to hold such member against displacement from a set position.

The spring-socket unit is detachably connected to the fixed socket unit by an interlocking connection, preferably in the form of bayonet joints. To this end, the fixed socket ring is provided with a plurality, three in the present instance, of inwardly projecting lock pins 41 adapted to enter bayonet grooves 42 in the sleeves 29. The entrance portion 43 of these slots is at a low gradual angle, so that when mounting the spring socket unit in position on the fixed socket unit, the spring resistance to retracting movement of the friction ring will be easily overcome by the pins 41 acting against the low incline of the bayonet slots. After the high point in the bayonet slots is passed, the pins 41 will be urged into the ends of said slots and locked therein by the stored-up pressure of the spring. Thus the spring 36 serves a dual purpose, namely, imposing friction on the ball member or holding it against displacement in its socket, but permitting it to be adjusted therein, and for holding the two socket units locked in operative relation. It will be manifest that the spring socket unit may be easily removed simply by turning it in a counterclockwise direction as viewed from the front, until the lock pins have cleared the high points in the bayonet slots, whereupon the spring socket units may be withdrawn forwardly while continuing to turn it until completely removed from said lock pins. In this regard, it will be noted that in mounting or removing the spring socket unit, it is not necessary to impose pressure axially of the unit, that is, toward the windshield, which is objectionable; instead this unit is mounted and removed by rotative movement similarly to tightening and loosening a threaded member.

The spring socket unit may be positively locked in operative position by a set screw 40, Fig. 6, threaded through the inwardly turned portion of the socket ring body 21 and adapted to enter one of the bayonet slots. This prevents theft of the removable units from the outside of a closed car.

A construction of the ball-and-switch unit will now be described. The ball member 16 which has a smooth spherical surface fitting the socket seats 23 and 37 may be of any suitable material, but is preferably of bakelite or some similar composition. A tube 44 passes diametrically through the ball member and is secured thereto by a set screw 45. This tube projects at both ends beyond the ball and carries on its forward and rear ends the above-mentioned reflector and handle 15 and 19, respectively. The reflector fits telescopingly on the tube and has a tubular portion 46 which enters an annular recess 47 in the ball. By adjusting the reflector axially on the tube 44, the focus of the spotlight may be changed and the reflector my be secured in any set position by the set screw 48. By extending the reflector tube 46 within the ball, a water-tight joint is provided by which it is practically impossible for water to seep through the reflector mounting into the reflector, an objection to some prior constructions. Within the tube 44 is secured a lamp plug designated generally by 50. This has a pair of spring-pressed plugs or contact elements 49 with which the points on the light bulb make contact. There is also supported in the tube, an oscillatory switch plug designated generally by 51, which has spring-pressed plugs or contact elements 52 adapted to be moved into and out of contact with the stationary contact points on the lamp plug 50. The switch plug is adapted to be oscillated by means of a switch pin 53 extending diametrically through the plug as shown in Fig. 9, and having ends 54 reaching through guide slots 55 in the tube 44 and into recesses 56 in a switch collar designated generally by 57. The ends of the switch pin 53 will be urged against the face 58 of each guide slot 55 by the action of the springs behind the contact elements 52, and each face 58 is brought to a high point at the center, so that the switch pin will be urged by said springs to either low end of said slot, thus holding the switch plug in either the one or off position. When assembling this unit, the switch pin 53 is inserted after the switch plug is in position, and after this the switch collar 57 is slid onto the tube 44 to locate the ends 54 of the switch pin in the recesses 56. A sleeve 59 fixed on the collar 57 overlies the recesses 56 and prevents endwise displacement of the switch pin. The rear end of the switch collar enlarged in diameter and knurled on its periphery facilities turning or throwing the switch, and fits over the forward end of the handle barrel 61, which in turn telescopes on the rear end of the tube 44. It will be observed that the handle is in the form of a pistol grip, providing a very handy control for the spotlight; also that the electric wires connected to the switch do not in any way interfere with manipulation of the handle. In this regard, it will be noted that the wires 62 connected to the switch plug are, when assembling this unit (the handle being off), passed through a narrow slot 63, Fig. 11, in the underside of the tube 44 and into a larger opening 64 at the forward end of said slot. The handle barrel 61, as shown in Fig. 7, has in its underside a slot 65 through which said wires pass when the handle is positioned on the tube 44, which slot is enlarged at 66, providing an opening from which the wires emerge. This opening 66 is smaller in diameter than the opening 64 and concentric therewith, so that the wires will be held by the barrel (which with the handle is preferably of bakelite or some insulating material) out of contact with the metal tube, thus preventing chafing of the wire on the tube or any adjacent metal part and preventing any tendency of short circuiting. The rear end of the slot 63 and the forward end of the slot 65 will be closed by mounting the handle on the tube, as will be obvious. The handle will be locked in such position by a clamp screw 67 which passes through the barrel 61 from below, through the slot 63 and is threaded into or enters a hole 68 in the opposite wall of the barrel. A clamp nut 69 arcuate in form as shown in Fig. 10, will be drawn downwardly by the screw for clamping the tube and barrel together, thus fixedly securing the handle to the tube. This construction permits mounting the handle with the clamp-screw attached and is another factor in aiding quick assembling.

From the foregoing, it will be manifest that my invention provides for so constructing the parts that they may be quickly assembled in a number of units which in turn may be quickly assembled in co-operative relation. This is beneficial and desirable as promoting economy in cost of manufacture. Such construction is also desirable from the user's standpoint, because the fixed socket unit may be installed on a windshield or other support without the spotlight-carrying part or unit; and this latter unit may be inserted and snapped into position with no adjustment of retaining or fastening means or of any parts whatsoever. Furthermore, this construction permits quick detachment of the spotlight-carrying unit, if for any reason this is desired without disturbing the mounting of the fixed socket unit on the windshield. In addition to these advantages there are many others appurtenant to the detailed construction, which will be apparent to those skilled in this art.

However, it should be understood that my invention in its broader aspect is not to be limited to these details of construction, but comprehends certain broad combinations as set forth in the claims. In this regard, it should be noted that the term "spotlight" is used in the claims as meaning any lamp or other device which it may be desired to support for universal movement; likewise, "ball member" is not limited to a single part ball, but comprehends any structure having a spherical exterior surface or any equivalent structure. Furthermore, the fixed and spring socket units may be reversed in position; and the term "unit" is not intended to comprise all of the parts shown herein as making up each unit, unless specifically claimed.

It is believed that the foregoing discloses the principles and mode of operation of my invention; and while I have shown for purpose of illustration but a single working embodiment, it should be understood that many changes might be made in details of construction and arrangement of parts within the scope and spirit of the invention set forth in the appended claims, in which—

I claim:

1. In combination, a support having an opening, a spotlight and handle-carrying ball member passing through said opening, a fixed socket ring providing a fixed seat for said ball member and having a clamp flange adapted to clamp against one side of said support, a ring nut on said socket ring adapted to clamp against the opposite side of said support, a spring socket unit providing a yieldable seat for said ball member, and a bayonet-joint connection between said fixed socket ring and spring socket unit.

2. In combination, a support, a ball member, a spotlight and a handle carried by the ball member on opposite sides thereof, a socket ring providing a fixed seat for the ball member, means for securing said socket ring to said support, a spring socket unit having a spring-pressed friction ring providing a yieldable seat for the ball member, said spring socket unit having a bayonet joint connection with the fixed socket ring, whereby said spring socket unit may be moved from said fixed socket ring without disturbing its mounting on said support.

3. In combination, a socket ring threaded on its periphery and having an outstanding annular clamp flange and an internal ball socket seat, a ball member on said seat, a spotlight and a handle mounted on the ball member on opposite sides thereof, a sleeve adapted to telescope within the socket ring, inwardly projecting lock pins on the socket ring, bayonet slots in said sleeve adapted to receive said lock pins, a friction ring carried by said sleeve and providing a socket seat for said ball member, and resilient means tending to urge said ring and ball member relatively together.

4. The combination set forth in claim 3, in which the resilient means for urging the friction ring and the ball member relatively together is a spring also adapted to hold the lock pins and bayonet slots in tight engagement.

5. In combination, a spotlight and a handle-carrying ball member, and means for supporting the ball member comprising ball socket seats, a coiled spring arranged in circular form for contraction against one of said seats, said spring having its ends disposed adjacent one another, and a screw member threaded into the coiled ends of said spring for coupling said ends together.

6. In a ball mounting for spotlights of the character described, in combination with a ball member, a support for said member comprising a socket ring on which the ball member is adapted to seat, a spring container unit comprising a friction ring for contacting on the ball member, a coiled spring arranged in circular form for urging said ring against the ball member, a sleeve shaped at one end to contain the spring and at its other end to be detachably fastened to the socket ring.

7. In combination with a support having an opening, a ball member equipped at one side with a spotlight and at the opposite side with a handle, a socket ring on which said ball member is adapted to seat, means for securing said socket ring to said support with the ball member in the opening, a plurality of lock pins carried by said socket ring, a spring container unit including spring means for yieldingly urging the ball member against said socket seat and having bayonet slots adapted to receive said lock pins, and means operable from one side only of the support for entering one of said bayonet slots to prevent relative displacement of the spring container unit with respect to the socket ring.

8. A ball mounting for windshield spotlights of the character described comprising in combination with a support having an opening, a ball member, a socket ring having a peripherally threaded cylindrical portion turned inwardly at one end providing a ball socket seat and outwardly at the opposite end providing an annular flange adapted to be clamped against one face of said support, a clamp ring threaded on said socket ring and adapted to be clamped against the opposite face of said support, inwardly projecting lock pins on the socket ring, and spring containing means for yieldingly engaging the ball member and urging it against said ball socket seat and having bayonet slots adapted to receive said lock pins.

9. A ball mounting as set forth in claim 8 in which the lock pins are located on the cylindrical portion of the socket ring intermediate the inwardly and outwardly turned ends thereof.

10. A ball mounting as set forth in claim 8 in which the spring-containing means has a cylindrical portion adapted to telescope within the cylindrical portion of the socket ring and in which said bayonet slots are formed.

11. A ball mounting as set forth in claim 8, in which said spring-containing means is increased in diameter at its end opposite from the bayonet slot end, a spring positioned in said enlarged diameter end, and a spring-retaining ring secured to said enlarged diameter end for holding the spring in position.

12. In a device of the character described, in combination, a support having an opening; a ball and switch unit passing through said opening and including a ball member, a tube passing through the ball member, a reflector carried on one end of the tube, a lamp plug and a switch plug carried within the tube, and a handle attached to the opposite end of the tube; a spring container unit including a sleeve circumscribing the ball and having a plurality of circumferentially spaced bayonet slots, a friction ring on the ball, a spring for urging the friction ring against the ball, and a knurled ring fixed to said sleeve and serving to hold the spring in operative relation to said friction ring; and a fixed socket unit including a socket ring having a fixed ball socket, bayonet pins adapted to enter said bayonet slots and to be locked therein for detachably connecting the spring container unit and socket ring, an annular flange adapted to clamp against one side of said support, and a clamp nut adapted to be tightened against the opposite side of said support for securing the socket ring in a fixed position thereon.

GEDOR W. ALDEEN.